United States Patent [19]

Spengler

[11] Patent Number: 4,717,143
[45] Date of Patent: Jan. 5, 1988

[54] SYSTEM FOR TRANSPORTING LIMP, FLAT SHEET MATERIAL

[75] Inventor: Ernst M. Spengler, Heusenstamm, Fed. Rep. of Germany

[73] Assignee: Stanztechnik GmbH R+S, Frankfurt, Fed. Rep. of Germany

[21] Appl. No.: 712,395

[22] Filed: Mar. 15, 1985

[51] Int. Cl.$^4$ ............................................. B65H 5/12
[52] U.S. Cl. ........................................ 271/267; 271/3; 198/463.3; 414/331; 26/52
[58] Field of Search ................... 271/277, 268, 85, 14, 271/3, 267, 269; 198/463.3, 468.1, 861.1; 26/52, 53, 1; 414/331, 414

[56] References Cited

U.S. PATENT DOCUMENTS

| | | | |
|---|---|---|---|
| 4,405,537 | 9/1983 | Spengler | 464/45 R |
| 4,457,662 | 7/1984 | Ireland et al. | 414/331 |
| 4,520,726 | 7/1985 | Rouly et al. | 271/267 X |

FOREIGN PATENT DOCUMENTS 48406  6/1984  Netherlands ................. 414/331

*Primary Examiner*—Douglas C. Butler
*Assistant Examiner*—Matthew C. Graham
*Attorney, Agent, or Firm*—W. G. Fasse; D. H. Kane, Jr.

[57] ABSTRACT

Pieces of flat sheet material, such as films of synthetics or cloth, are fed by a transport apparatus in a stretched out condition into a processing station, for example a molding and laminating station or a treatment station. The transport apparatus uses either tentering type frames or a conveyer with tentering chains. A piece of flat sheet material is attached to a tentering frame or to the tentering chains by a respective apparatus. The tentering frames are moved vertically in a determined order between a lower position, an intermediate position, an upper position and a delivering position located in the processing station horizontally at the same level as one of the three other positions, whereby a tentering frame carrying a piece is moved into the processing station for delivering the piece of sheet material and back again for exchange with a tentering frame carrying another piece of sheet material. The tentering chain type conveyer receives flat material from a supply roller, whereby pieces are cut, attached to the tentering chains and moved into the delivering position in a piece by piece intermittent fashion. Both, the tentering frame and the tentering conveyer use elongated clamps capable of exerting a uniform clamping pressure along the entire length of the respective clamp.

9 Claims, 20 Drawing Figures

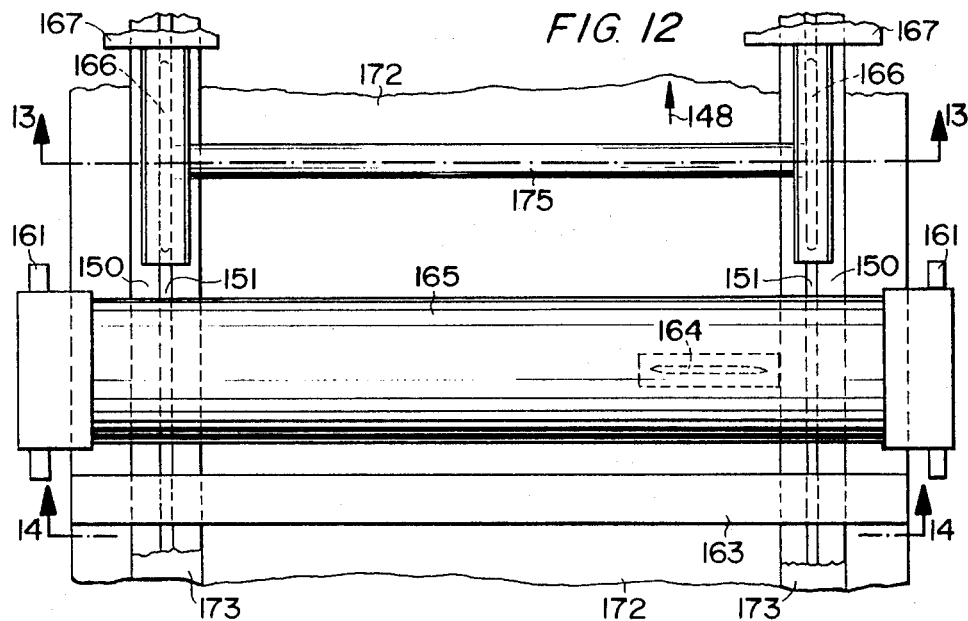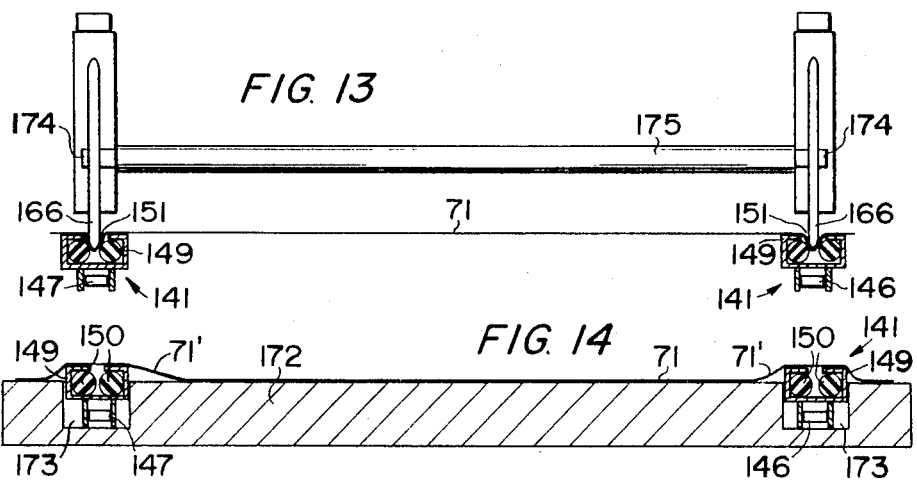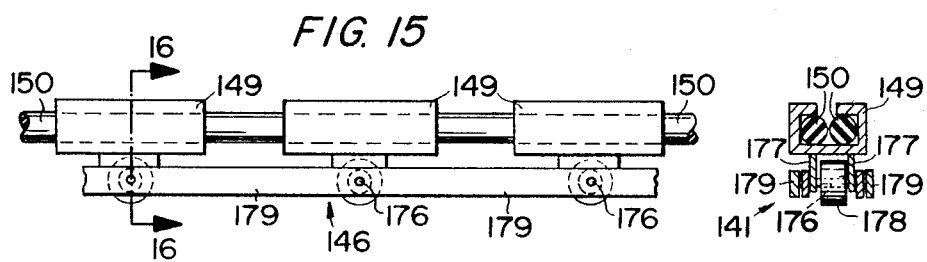

SYSTEM FOR TRANSPORTING LIMP, FLAT SHEET MATERIAL

CROSS-REFERENCE TO RELATED APPLICATIONS

My copending applications U.S. Ser. No. 712,708, filed on Mar. 15, 1985 now U.S. Pat. No. 4,634,483, U.S. Ser. No. 712,709, filed on Mar. 15, 1985, U.S. Ser. No. 712,567, now abandoned, filed on Mar. 15, 1985, and U.S. Ser. No. 719,497 now abandoned, filed on Apr. 4, 1985 are related to the present disclosure.

FIELD OF THE INVENTION

The invention relates to an apparatus for transporting limp, flat sheet material, such as films of synthetics, woven fabrics, cloth and the like.

DESCRIPTION OF THE PRIOR ART

The handling and treating of flat materials poses certain problems if these materials must be presented to a processing station in a flat, stretched out condition because the materials are too limp for inherently maintaining a sufficiently flat shape, for example, when such material must be moved as successive sheets into a laminating station, in which the sheets are to be laminated to a substructure, such as the inner framework of a vehicle door, which is to be covered by the flat material for decorative or finishing purposes. If wrinkling or creasing of the flat material is not prevented at the time of moving the flat material into the laminating press, creases and wrinkles may also appear on the surface of the finished product, resulting in a reject.

Further, transporting such flat materials through a treatment station, for example a drying station, also has posed problems heretofore, since it has been difficult to avoid wrinkles caused by the drying, when the edges of the sheet material are not uniformly clamped down. Tentering hooks or clamps secured to tentering frames or tentering chains have been used heretofore for holding the sheet material as flat as possible while moving the sheet material through a treatment station. Prior art tentering hooks or clamps are not capable of applying a uniform clamping force along both edges of a piece of fabric, for example.

Conveyers have been used heretofore for moving flat material into a treatment station. However, such conveyers have not been capable of presenting the sheet of flat material in a truly flat state to a treatment station. A manual smoothing of the sheet material was frequently required. My U.S. Pat. No. 4,405,537 discloses in its FIG. 3 a two tier type of conveyer in which the upper tier shuttles back and forth between a sheet receiving station and a sheet delivering station. This type of conveyer is perfectly practical where the sheet material has a certain stiffness, so that wrinkling is naturally avoided.

OBJECTS OF THE INVENTION

In view of the above it is the aim of the invention to achieve the following objects singly or in combination:

to provide a system for handling and treating flat material, especially limp material, so that the material may be presented in a flat state for further handling and/or treating, for example, in a laminating station;

to generally avoid wrinkling of limp, flat materials when they are subjected to handling and or treatment steps;

to provide an elongated clamping device suitable for a tentering frame for securing a flat piece of material to the tentering frame in such a way, that a constant stretching force is applied uniformly along at least two opposite edges of the flat material, or even along all four edges;

to provide a loading station for holding several tentering frames which are sequentially shuttled, one tentering frame at a time, back and forth between the loading station and a delivering station, such as a laminating press;

to provide a tentering chain type transport apparatus for moving initially flat material into a processing station, whereby the flat material can be reeled off a supply roller, although the processing station receives one cut-off piece of sheet material at a time;

to construct a tentering chain type conveyer which can clamp a piece of sheet material along two edges or along all its four edges;

to provide a tentering chain type of conveyer which is capable of handling sheet material having different widths or which is adjustable for handling sheet material having different widths; and to provide an apparatus for performing several different operations on an initially flat work piece, such as laminating the flat material to a substructure and trimming all the edges of the flat material prior and/or after the laminating.

SUMMARY OF THE INVENTION

According to the invention pieces of stretched out sheet material are transported to a processing station with the aid of tentering frames and a handling apparatus having a machine frame with three vertically aligned frame positions. Two tentering frame for holding pieces of sheet material are located on carrying members in any two of the three frame positions. A first moving device is arranged in the machine frame for moving the carrying members and thus the tentering frame vertically up and down to any one of said three vertically aligned positions. A second moving device is operatively arranged for moving the tentering frames, one at a time, substantially horizontally back and forth between the processing station and one of the three vertically aligned positions for transporting a tentering frame holding a piece of sheet material into the processing station and for returning an empty tentering frame for receiving a new piece of sheet material. The first moving device includes position variable members operatively arranged for permitting a vertical movement of a tentering frame in one position of the position variable members and for supporting the tentering frames in another position of the position variable members. In this type of supply apparatus, the sheet material may be manually secured to the tentering frames, or the sheet material may be secured to the tentering frames in a separate apparatus as will be described below.

Rather than attaching the flat sheet material to the tentering frames by hand, it is more efficient to use an apparatus, wherein a piece of flat sheet material is cut off from a continuous supply roller. The sheet is moved onto a supporting member having a flat surface to hold the sheet material in a plane substantially coinciding with a plane defined by the tentering frame, which is held by a second supporting member in such a position, that the clamping gaps of the tentering frame face one surface of the flat sheet material and so that folding means are arranged to face the opposite surface of the sheet material for squeezing a margin of the sheet material into the respective clamping gap. Once the sheet material is properly secured to the tentering frame the latter is transferred into the transport apparatus for proper and precise insertion into a processing station. The transfer of a filled tentering frame to the transport apparatus out of the attaching apparatus and the return of an empty tentering frame may be accomplished manually or by mechanical means.

Rather than using tentering frames for presenting flat sheet material in a stretched out manner to a processing station, the sheet material could be transported in such stretched out condition with an endless chain conveyer driven, for example, by sprocket wheels. The endless chain conveyer, according to the invention, comprises two endless chain runs, each run having an upper chain run portion and a lower chain run portion, each chain run comprises a plurality of elongated clamping sections pivotally secured to the respective chain run, for forming tentering chains. Each clamping section comprises at least one elongated elastically yielding element and at least one elongated counter element, arranged alongside the elastically yielding element. Both elements are rigidly held together for forming a clamping gap lengthwise between the elements and along each chain run. Each clamping gap faces upwardly in the upper chain run portion for clamping a longitudinal edge of the flat sheet material in each clamping gap alongside each of the chain runs. This type of chain conveyer may be modified by clamping rails extending in pairs across the travel direction and connected at the ends of the clamping rails to the respective chain run. In the chain conveyer so modified, all four edges of a piece of sheet material my be squeezed into the respective clamping gaps. In both instances, the sheet material is supplied as a continuous web from a roller. However, the chain conveyer travels intermittently, so that it is stationary at the time, when a piece of sheet material is cut off from the roller supplied web and attached to the clamping gaps. The intermittent feed advance of the conveyer is also synchronized with the operation of the processing station, in which a supplied sheet is, for example, laminated to a substructure, such as a car dash board.

The system for transporting pieces of limp, flat sheet material from a supply of such sheet material to a processing station comprises tentering means either in the form of frames or in the form of a conveyer, which include clamping gaps facing the sheet material plane. In other words, the clamping gaps extend substantially perpendicularly to a plane defined by the flat sheet material in a stretched out wrinkle free condition. The clamping gaps further extend along at least two opposite edges of the sheet material and means, such as rollers disks, or folding bars are provided for inserting or attaching opposite edges of the sheet material to the clamping gaps, whereupon the tentering means, such as a tentering frame or a tentering conveyer are moved to the processing station.

BRIEF DESCRIPTION OF THE DRAWINGS

In order that the invention may be clearly understood, it will now be described, by way of example, with reference to the accompanying drawings, wherein:

FIG. 12 is a partial view in the direction of the arrow 12 in FIG. 11 showing a cutting station including a hold-down bar, a cutting device and a folding mechanism;

FIG. 13 is a sectional view along line 13—13 in FIG. 12 showing the operation of a folding mechanism for the longitudinal sheet material margins;

FIG. 14 is a sectional view along section line 14—14 in FIG. 12 showing a guide table for the tentering chains;

FIG. 15 is an enlarged view in the same direction as in FIG. 11, showing a side view of an upper run portion of the tentering chain conveyer;

FIG. 16 is a sectional view along line 16—16 in FIG. 15;

DETAILED DESCRIPTION OF PREFERRED EXAMPLE EMBODIMENTS AND OF THE BEST MODE OF THE INVENTION

Figure 1:
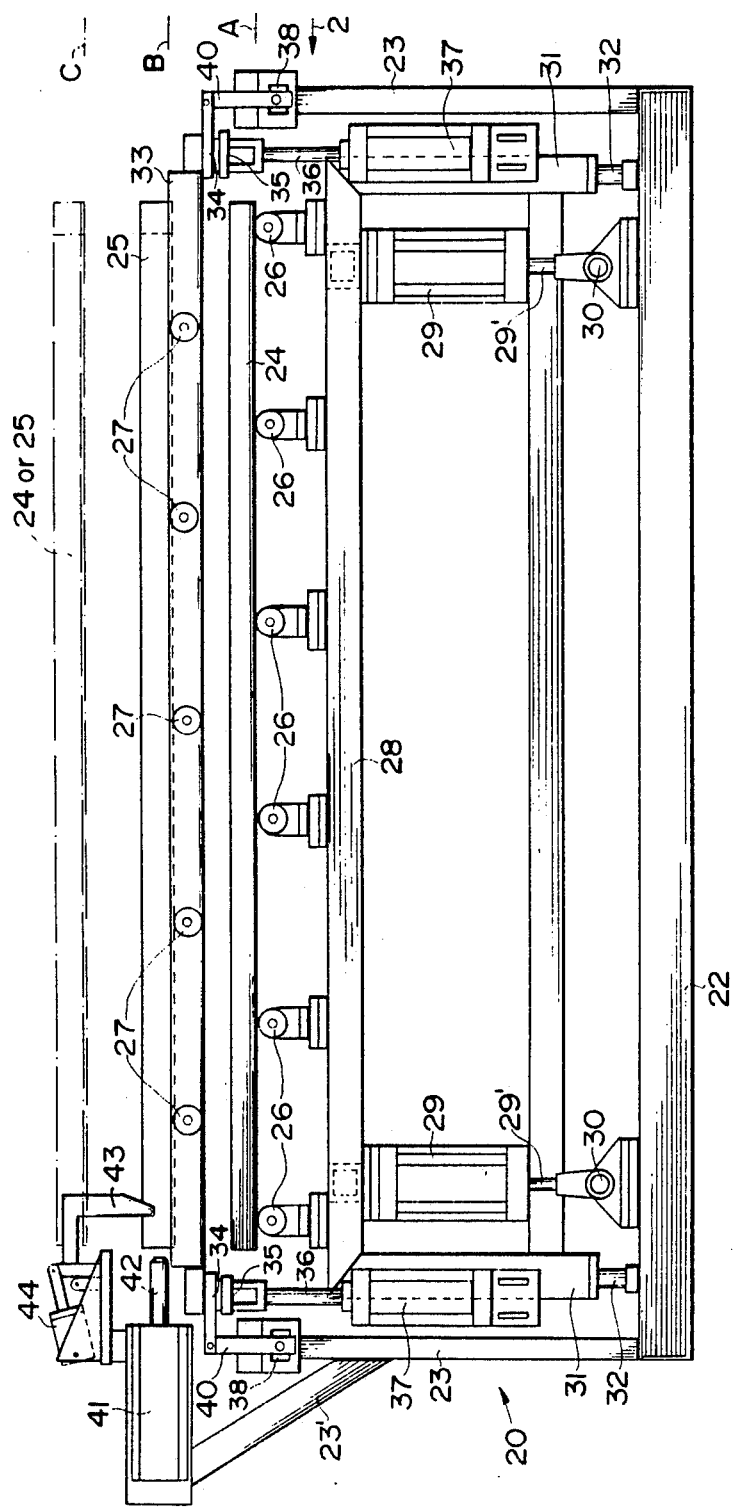
FIG. 1 is an elevational side view of an apparatus for transporting pieces of flat sheet material carried on tentering frames, one at a time, to a processing station for the flat sheet material.
Figure 2:
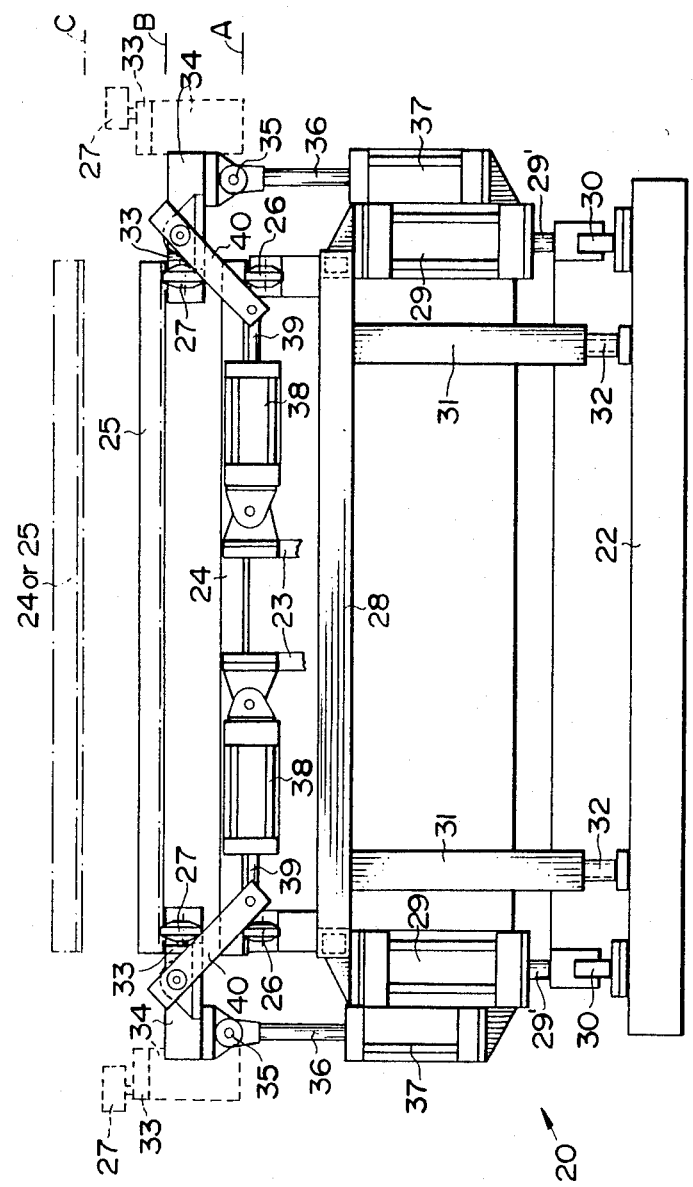
FIG. 2 is an end view of the apparatus of FIG. 1 in the direction of the arrow 2 in FIG. 1.
Figure 4:
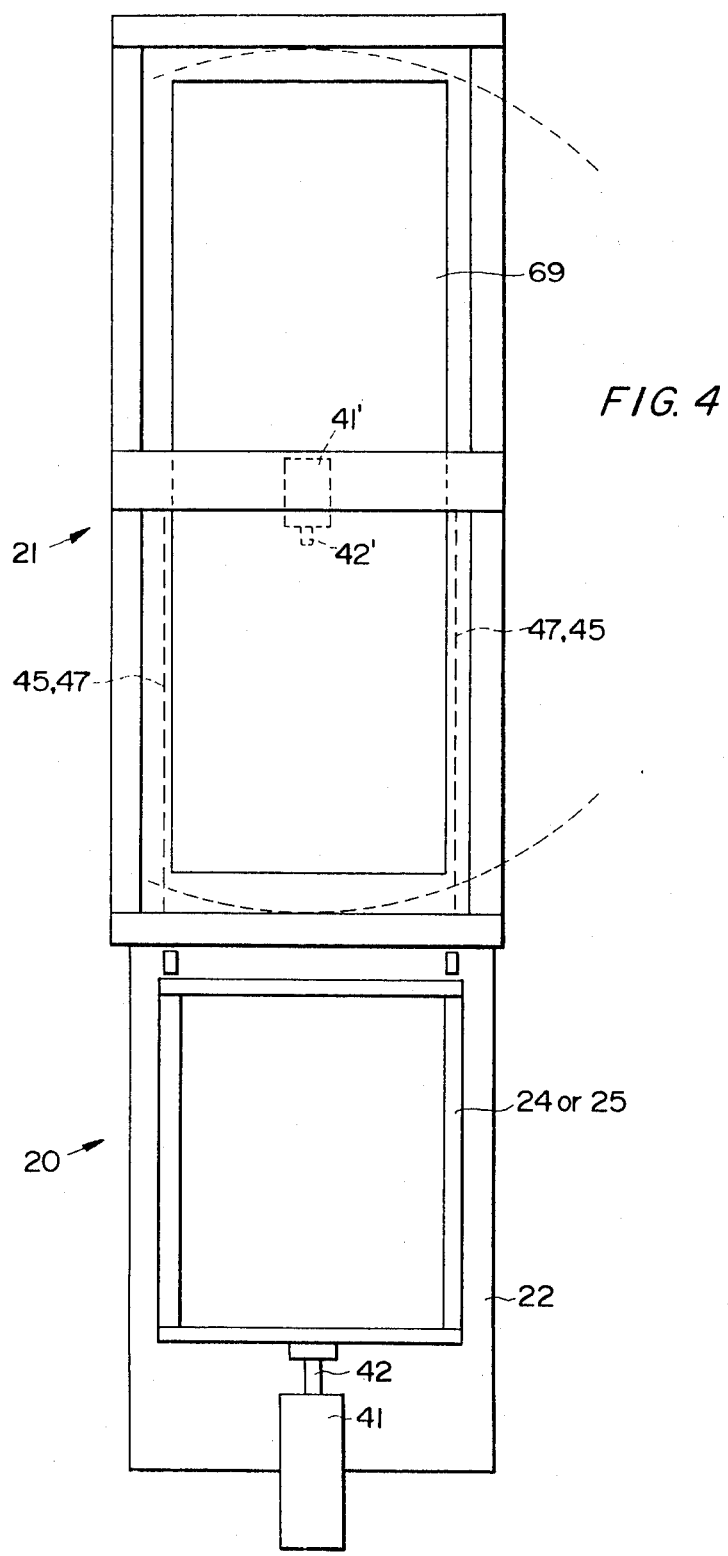
FIG. 4 is a schematic, simplified top plan view of a tentering frame transport apparatus of FIGS. 1 and 2 arranged for cooperation with a sheet material processing station.

FIGS. 1 and 2 show an apparatus 20 for transporting pieces of flat sheet material, especially limp sheet material, into a processing station 21, shown in FIG. 4. The transport apparatus 20 comprises a machine base or frame 22 with frame members 23 for mounting machine components to be described below. A pair of tentering frames 24 and 25 for holding pieces of sheet material are supported by carrier means to be described in more detail below, in three vertically aligned positions or levels A, B and C. Level A is a waiting position. Level B is an exchange position. Level C is a filling or replacement position. The carrier means comprise two sets of first rollers 26 and two sets of second rollers 27. Each set of rollers forms a guide track for the tentering frames 24 and 25. These tentering frames just ride on the rollers 26, 27 and are easily removable from the rollers.

The first sets of rollers 26 are supported on a machine frame member 28 for moving the rollers from the level A into the level B. Movement into the level C is described below. Four piston cylinder devices 29 are operatively connected between the frame member 28 and the base 22 for movement between level A and B or B and A. Preferably the piston rods 29' are pivoted to the base 22 as shown at 30. To assure a guide vertical up and down movement, the frame member 28 is slidably connected to the base 22 by four vertical guide cylinders 31 riding along guide columns 32.

Conventional so-called ball boxes are suitable for this guide purpose.

Two beams 33 support the second sets of guide rollers 27. The beam 33 in turn are carried by arms 34 pivoted at 35 to piston rods 36 of respective four piston cylinder devices 37 supported by the frame member 28. Thus, when the frame 28 is lifted by the piston cylinder devices 29, the piston devices 37 are also moved up or down respectively. The operation of the apparatus will be described in more detail below with reference to FIGS. 5 and 6.

In view of the foregoing, it will be appreciated, that the first moving means for the vertical up and down movement include the carrier means, such as the rollers 26 and 27 and the arms 34. When the arms 34 are in the full line position, shown in FIG. 2, the rollers 26 cannot be moved past the arms 34. However, when the arms 34 are tilted into the dashed-line position, as shown in FIG. 2, then the arms 34 can be moved sufficiently down and tilted back under a tentering frame on the rollers 26 in level B for further movement into level C with the aid of the piston drives 36, 37. For this purpose the arms 34 are tiltable by four respective piston cylinder devices 38 having piston rods 39 connected in an articulated manner to the arms 34 by links 40. The lower end of the links 40 is pivotally connected to the piston rods 39. The upper end of the links 40 is pivotally connected to the arms 34. Thus, the pivoting or articulation is such, that the vertical up and down movement with the aid of the piston cylinders 29 and 37 is possible along with the tilting movement of the arms 34 between the full-line tilted in position and the dashed-line tilted out position, as shown in FIG. 2.

Second moving means are provided for moving one tentering frame at a time substantially horizontally back and forth between the processing station and one of the three vertically aligned positions preferably the position B which is at the same level as the receiving level in the processing station 21. For this purpose an impinging piston cylinder device 41, having a piston rod 42 is supported by the machine frame 23' in such a position, that the piston rod 42 can apply an impact force to the tentering frame located at the level B. The piston rod 42 is not connected to the tentering frame. Thus a filled tentering frame receives an impact from the piston rod 42 sufficient to slide the frame into the processing station 21. When the piece of sheet material has been removed from the tentering frame in the processing station, for example, by cutting, as will be described below in more detail, the tentering frame is pushed back into the transporting apparatus shown in FIGS. 1 and 2. This may be accomplished either manually by the operator or by another piston cylinder device 41', 42' located in the processing station 21.

In order to prevent a tentering frame from sliding away when a piece of sheet material is being attached, a locking claw 43 operated by a piston cylinder device 44 is provided in the upper left hand corner of FIG. 1. The piston cylinder device 44 is conventionally supported on the machine frame. If desired, the plane defined by the rollers 26, 27 may be slightly inclined, so that the tentering frames will roll back by gravity out of the processing station 21 into the transport apparatus 20.

In that case, the impact applied by the piston rod 42 would have to be sufficient to move the tentering frame up on the slight incline.

Incidentally, the locking claw 43 with its drive 44 is especially suitable, when flat, limp sheet material is to be attached manually to a tentering frame 24, 25 in the transport apparatus 20. The locking claw 43 then keeps the frame from rolling away.

Figure 3:
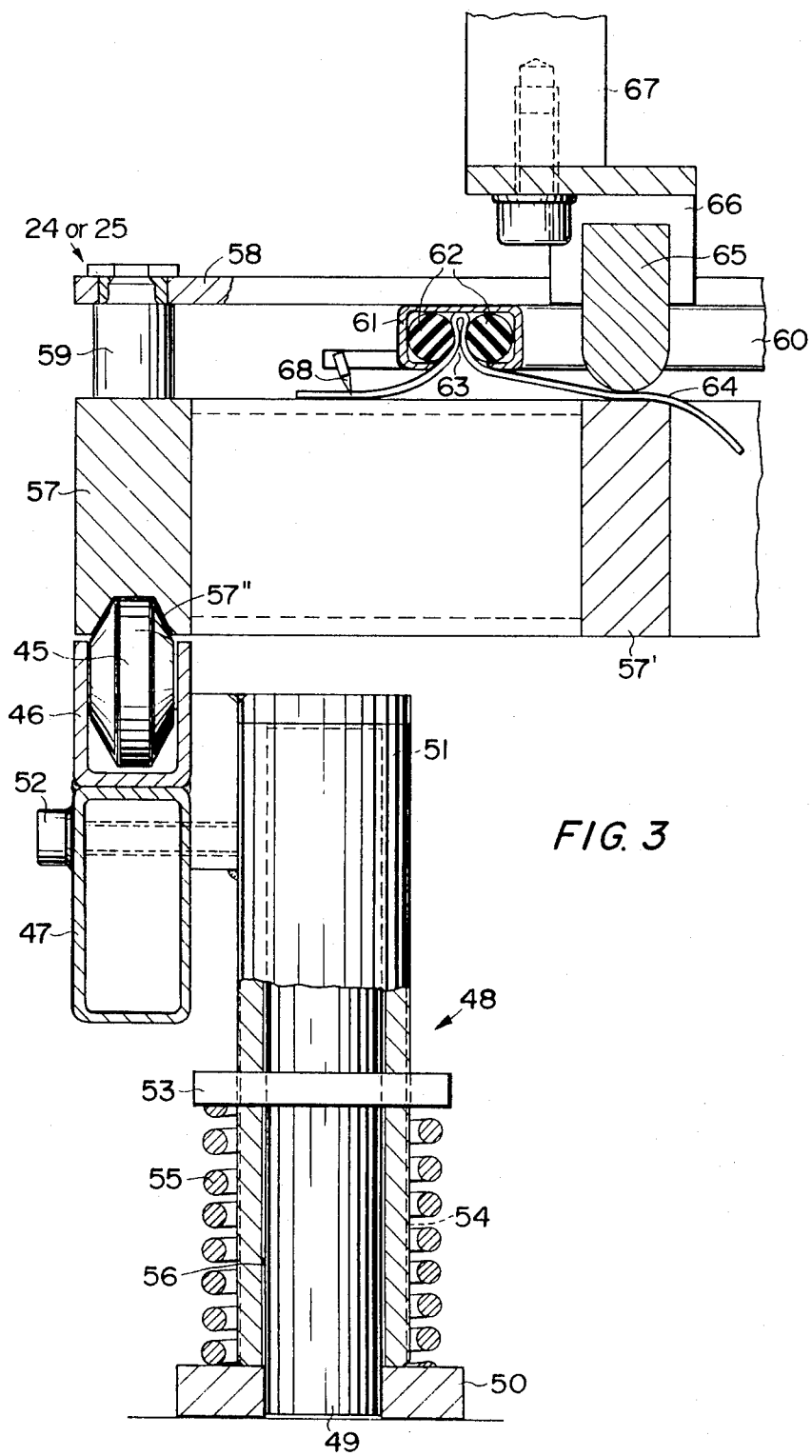
FIG. 3 shows on an enlarged scale, relative to FIGS. 1 and 2 a view partially in section through part of a tentering frame structure in a sheet material processing station, such as a laminating station, whereby the tentering frame is in the mold closed position.
Figure 11:
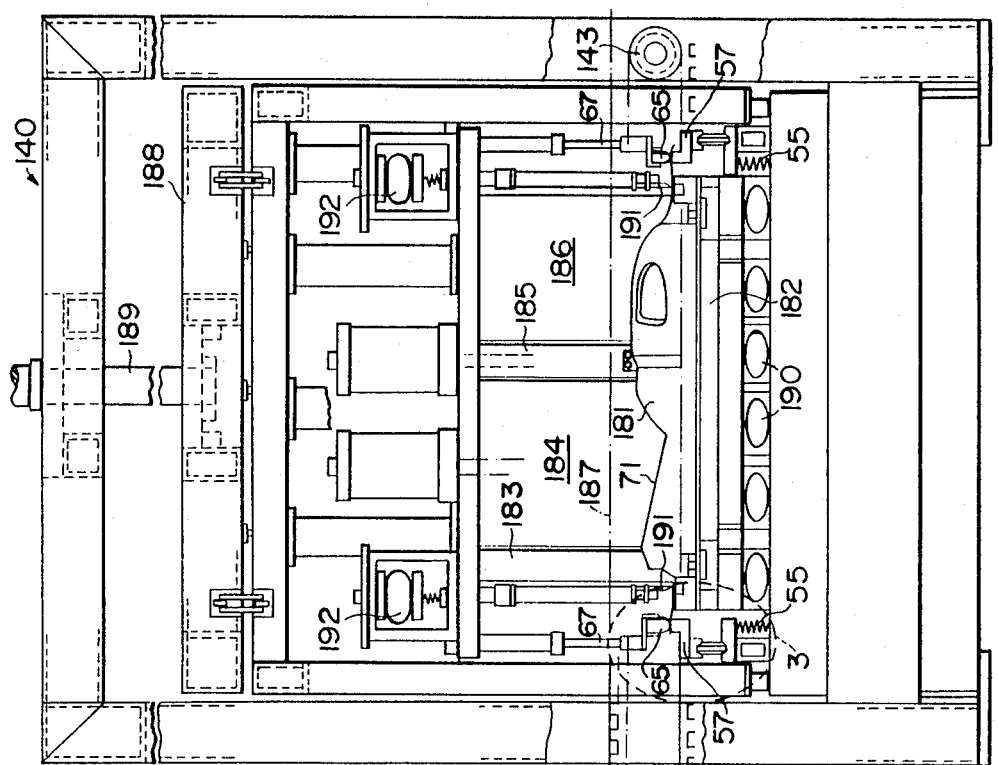
FIG. 11 shows an elevational side view of another embodiment of an apparatus for transporting pieces of flat sheet material on a tentering chain conveyer in an intermittent manner to a station for processing pieces of flat sheet material.

FIG. 3 shows further details of the tentering frames 24 or 25, whereby the view shown in FIG. 3 on an enlarged scale is approximately the portion enclosed by a dashed line 3 in FIG. 11. In the processing station 21 the tentering frame 24 or 25 is supported by rollers 45 rotatably mounted in brackets 46 secured to rails 47. The rails 47 in turn are secured to a support structure 48 forming part of the processing station. The support structure comprises an upright post 49 rigidly secured to a base 50 and a telescoping tubular member 51 to which the rails 47 are secured by bolts 52. The tubular member 51 can telescope vertically up and down guided by the post 49 to permit the closing of a mold in the processing station, as will be described in more detail below with reference to FIG. 11. As shown in FIG. 3 the tubular member 51 is in its lowermost position which means, that the mold is closed. Additionally, the normal position of the tubular member 51 relative to the post 49, when the mold is open, can be adjusted by a nut 53 rotatable on a threading 54 on the outside of the member 51. A compression spring 55 is located between the base 50 and the adjustment nut 53 and surrounds the tubular member 51. When the mold is open in the processing station, the spring 55 will push the rails 47 and thus the rollers 45 upwardly to a level, in which the rollers 45 are at the same level as the level B in FIGS. 1 and 2. Thus, a tentering frame can easily ride from the rollers 26, 27 onto the rollers 45 and back again.

A lubricant or friction reducing coating 56 may be provided between the inner surface of the tubular member 51 and the outer surface of the post 49, whereby the up and down movement is facilitated and a proper guiding is assured.

Each tentering frame 24, 25 comprises a main frame 57 for structural rigidity and a sheet material carrier frame 58. The carrier frame 58 is releasably secured to the main frame 57 by conventional spacer members 59. The carrier frame 58 carries a clamping device 60 having a tubular stock housing 61 with two rubber cords 62 relatively tightly held in the housing 61 to form a clamping gap 63 in which the margin of a piece of sheet material 64 is held in place.

The main frame 57 of the tentering frames includes a rail member 57' which cooperates with a counter holder rail 65 secured to a bracket 66 which in turn is attached to a piston rod 67 of a piston cylinder device forming part of the processing station to be described below with reference to FIG. 11. Pin-type members 68 may be secured to the housing 61 for initially holding a margin of a piece of sheet material 64 in place prior to squeezing the margin into the clamping gap 63. Further, the main frame 57 of each tentering frame is preferably provided with a guide groove 57" for riding on the rollers 26, 27 and 45. If desired, the mounting elements for the rollers 26 in FIGS. 1 and 2 may also be spring biased substantially as shown for the support structure 48 in FIG. 3.

The schematic top plan view of FIG. 4 illustrates the relationship of the transport apparatus 20 to a processing station 21, which may comprise a rotatable platform 69 for moving, for example, mold members from one work position into another work position and back again. The rails 47 with their guide rollers 45 are merely shown by a dashed line in FIG. 4. These rails 47 are aligned with level B formed by the rollers 26, 27 for the above mentioned shuttling movement of a tentering frame 24, 25.

Figure 5:
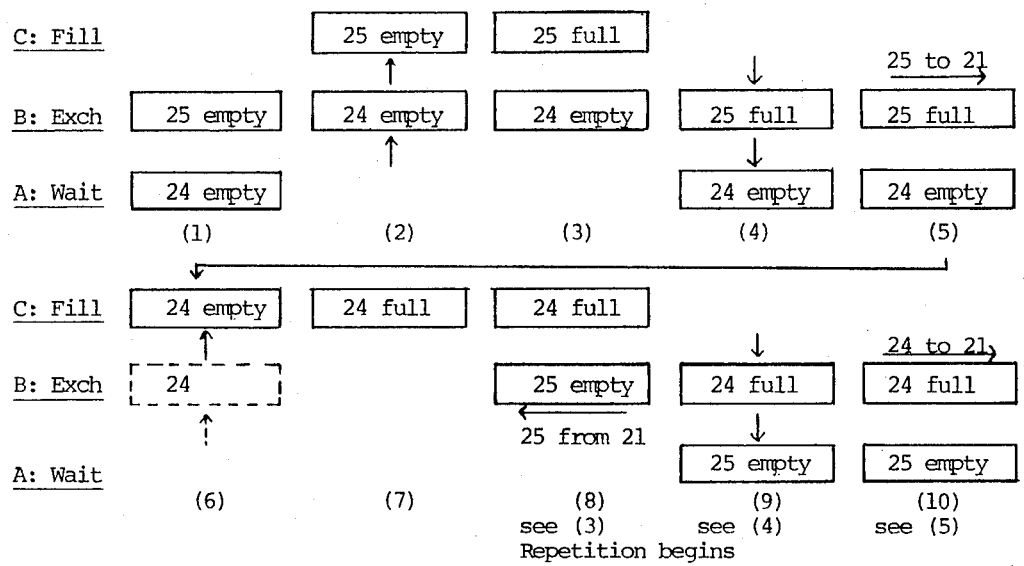
FIG. 5 is a block diagram of a sequence of operational steps performed by the apparatus of FIGS. 1 and 2 for transporting a stretched out piece of flat sheet material to a processing station.

The operation of the transport apparatus 20, shown in FIGS. 1 and 2 will now be described with reference to FIGS. 5 and 6. Referring first to FIG. 5, in step (1) both frames 24 and 25 are empty and at the levels A and B respectively as shown in FIG. 1. In step (2) both frames 24, 25 are lifted by the piston cylinders 29. In step (3) a piece of sheet material 64, shown in FIG. 3, is attached to the tentering frame 25, which at this time is at the filling level C. In step (4) both frames are lowered, so that the full frame 25 may be at the level of the rollers 45 in FIG. 3. In step (5) the full frame 25 is moved into the processing station 21 by the piston cylinder 41, 42. In step (6) the tilting piston cylinders 38, 39 tilt the arms 34 with the rails 33 and the rollers 27 into the dashed-line position in FIG. 2. When the arms 34 are in this dashed-line position, the lifting piston cylinders 36, 37 are lowered so that the rails 33 substantially come to the level A. The tilting cylinders 38, 39 now return the arms 34 and rails 33 into the horizontal position thereby bringing the rails 33 below the frame 24 at the level A. For this purpose, the rollers 27 are staggered relative to the rollers 26, so that the rollers 27 may enter into the spaces between the rollers 26 for picking up the frame 24, carried by the rollers 26. Furthermore, the rollers 27 are laterally attached to the rails 33 so that the rails 33 will still remain outside the space occupied by the rollers 26. In step (6) then the piston cylinders 29, 29' lift the entire carrying members from level A to level B and the piston cylinders 36, 37 continue the lifting so that frame 24 is brought to the level C. In step (7) a piece of sheet material is attached to the frame 24 in level C which is now full. In step (8), the empty frame 25 is returned from the station 21 either manually or also by an impact piston cylinder not shown, but corresponding to the impact cylinder 41, 42. Now the empty frame 25 rests on the rollers 26 at the level B and the operational steps are repeated. Thus, step (9) corresponds to step (4) and step (10) corresponds to step (5) etc..

Figure 6:
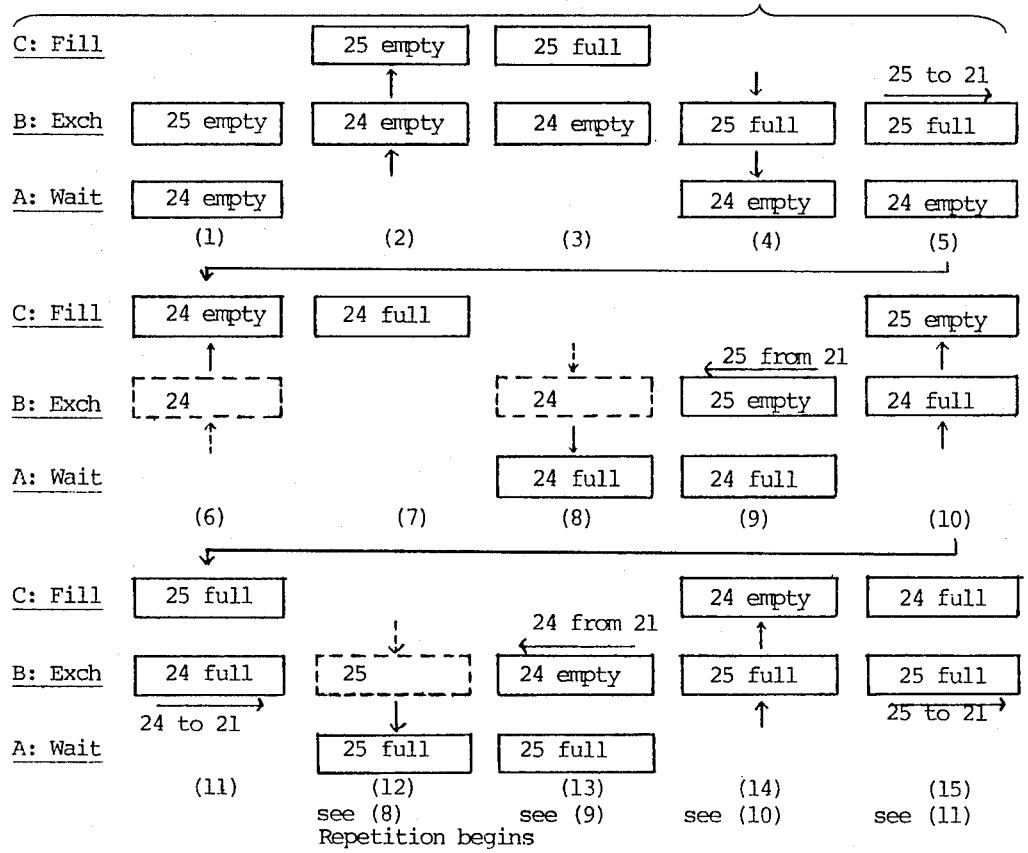
FIG. 6 is a block diagram similar to that of FIG. 5 but with a modification in the sequence of transporting steps.

The operation in FIG. 6 is in effect the same as in FIG. 5, except that in step (8) the frame 24 carrying a piece of sheet material is transferred down to the level A, so that in step (9) an empty frame is above a full frame rather than vice versa. Other modifications in the cycling of the full and empty tentering frames 24, 25 are possible and the operation of the pressure apparatus is not limited to any particular cycle sequence.

Figure 7:
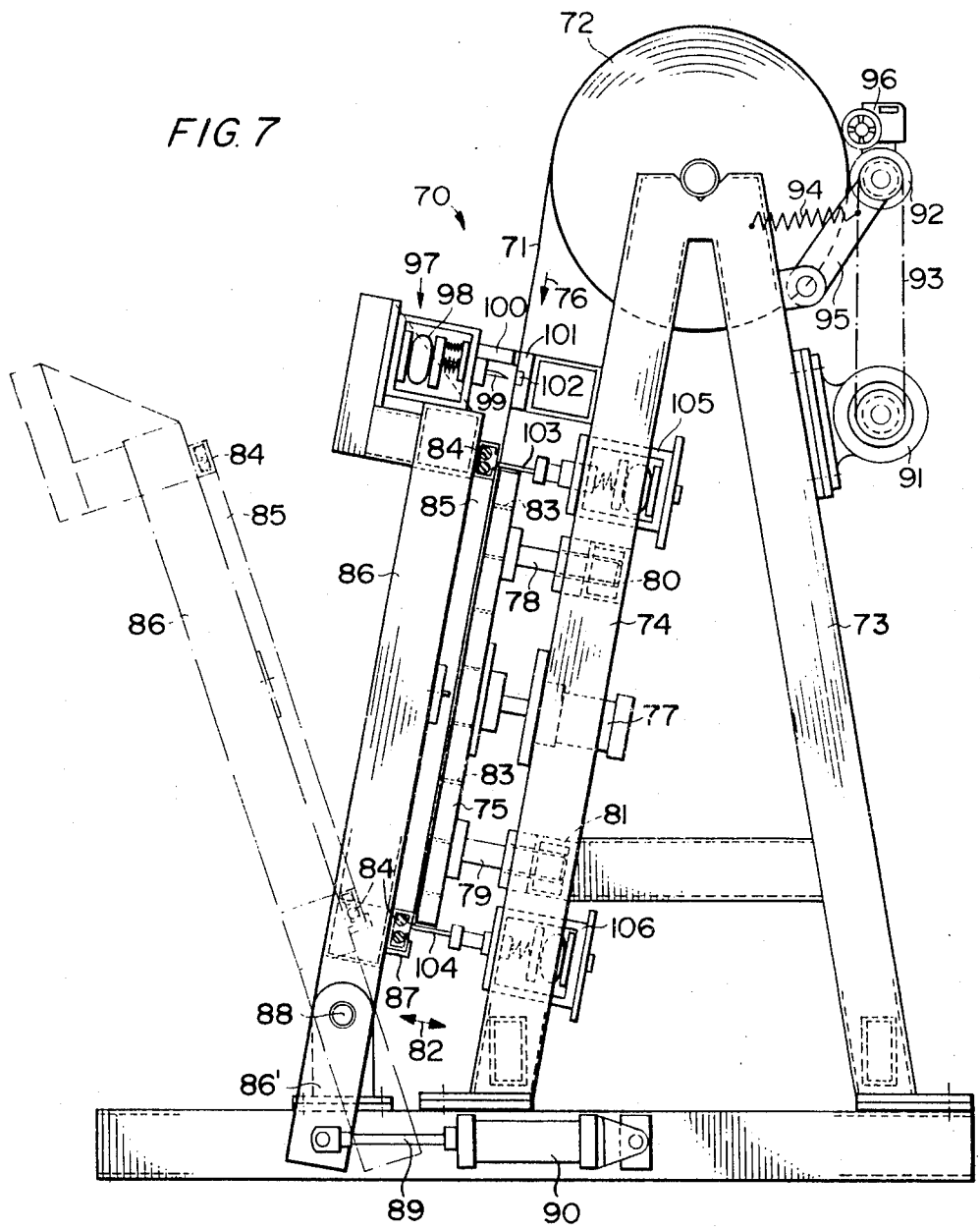
FIG. 7 is an elevational side view of an apparatus for clamping two opposite margins of a piece of flat sheet material coming from a supply roller to a tentering frame which then may be transferred, for example manually, to the apparatus of FIGS. 1 and 2 for transport into a processing station.

FIG. 7 shows an apparatus 70 for attaching a piece of sheet material 71 coming from a supply roller 72 supported on a machine frame 73 forming a substantially an A-frame, carrying a first supporting plate 75 extending at a slant as shown. The supporting plate 75 has a flat surface for supporting a piece of sheet material 71 as it slides down onto the plate 75 in the direction of the arrow 76, when the roller 72 rotates counter-clockwise. The plate 75 is supported on the frame section 74 by at least one piston cylinder device 77 and by two guide members 78 and 79 guided in ball boxes 80 and 81 respectively. Operation of the piston cylinder 77 permits adjusting the location of the plate 75 back and forth in the direction of the arrow 82.

Suction holes 83 in the plate 75 are connected to a source of reduced pressure, not shown. Suction applied through the holes 83 hold a sheet 71 temporarily in place until two opposite edges of the sheet 71 are squeezed into the clamping devices 84 of a tentering frame 85.

The tentering frame 85 is held in a hingeable frame component 86 provided with a stop holder 87 for the tentering frame 85. The frame component 86 is secured to the machine frame 73 by a hinge 88 and an extension 86' of the frame component 86 is pivoted to a piston rod 89 of a piston cylinder device 90 for tilting the frame component 86 between the full line position and the dash-dotted line position as shown in FIG. 7.

The frame member 73 carries a motor 91 which drives a roller 92, for example through a belt or chain drive 93, rotating the roller 92 clockwise so as to rotate the supply roller 72 counter-clockwise. A spring 94 is effective on an arm 95, which holds the roller 92 so as to press the roller 92 against the surface of the roller 72. A counter 96 of conventional construction measures off a predetermined length of sheet material for controlling a cutting mechanism 97 mounted on the hingeable frame component 86. The cutting mechanism comprises a linear pneumatic drive 98 which is described in more detail in my U.S. Pat. No. 4,286,490. When the hose of the linear pneumatic drive 98 is expanded by pneumatic pressure, it drives a cutting edge 99 and a hold-down bar 100 against a counter member 101. The counter member 101 is mounted on the frame portion 74. The hold-down bar 100 contacts the sheet 71 prior to the contact of the sheet 71 by the knife edge 99. Thus, proper cutting of the sheet is assured. A replaceable strip 102 of relatively hard synthetic material may be located opposite the knife edge to protect the counter holder 101. The cutting operation may be controlled either manually or by an electrical signal from the counter 96. When a piece of sheet material has been cut and is held in place on the plate 75 by suction through the holes 83 the frame component 86 with a tentering frame 85 inserted therein is closed, for example manually, whereby two opposite sheet margins are squeezed into the clamping gap as shown at 63 in FIG. 3, with the aid of folding edges 103 and 104, operated by respective linear pneumatic drives 105 and 106 mounted on the frame member 74. All the pneumatic drives are equipped with re-set springs as is known.

Once the two opposite margins of a piece of sheet material are properly squeezed into the clamping devices 84 of the tentering frame 85 the latter is removed from the frame component 86 after the latter has been opened, whereupon the tentering frame 85 may be inserted in the apparatus shown in FIGS. 1 and 2.

In view of the above description of FIG. 7 it will be appreciated, that the folding edges 103 and 104 face the sheet material on one side thereof, while the clamping device 84 faces the sheet material on the opposite side thereof. This type of operation has been made possible by the fact, that the clamping forces exerted by the clamping device 84 extend in a direction parallel to the plane defined by the sheet material.

Figure 8:
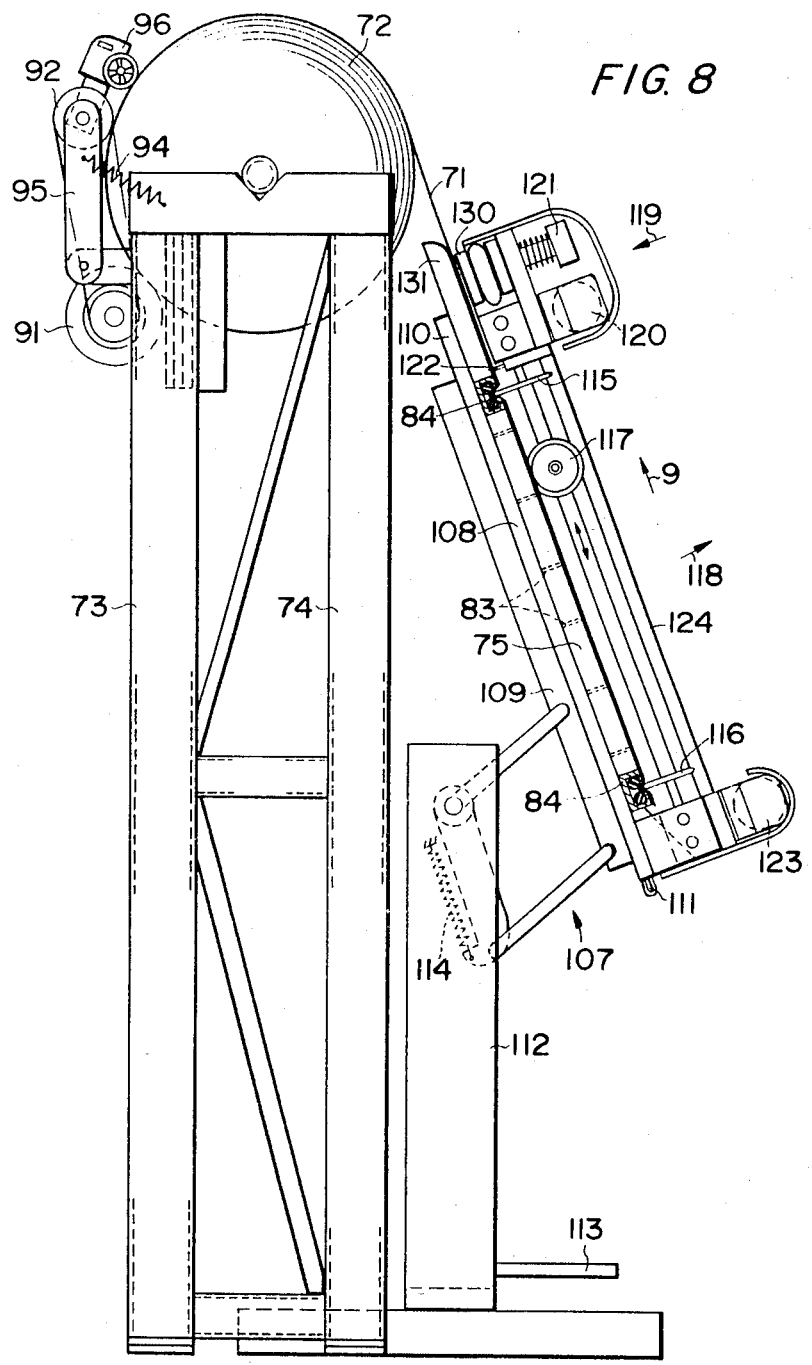
FIG. 8 is an elevational side view of an apparatus similar to that of FIG. 7 for clamping all four margins of a piece of flat sheet material to a tentering frame.

FIG. 8 illustrates an apparatus similar to that of FIG. 7 and component performing the same function are provided with the same reference numbers. The flat surface plate 75 is supported in FIG. 8 by a parallelogram-type structure 107 which as such is conventional and, for example, of the same type as used for supporting a drafting board. A space 108 between the plate 75 and a carrier member 109 of the parallelogram structure 107 is enclosed by wall members 110. A rapid connecting nipple 111 permits connecting the space 108 to a source of reduced pressure, not shown. The parallelogram structure 107 is supported in a pivotal, conventional manner by a post 112 and is operable by a foot peddle 113 for adjusting the position of the plate 74 for the convenience of the operator. A spring 114 holds the parallelogram 107 and thus the plate 75 in the adjusted position, also as is conventional.

In FIG. 8 the tentering frame is located around the plate 75 so that the plate 75 simultaneously assumes the function of the stop holder 87 in FIG. 7. Further, in FIG. 8, the clamping devices 84 extend all around the four edges of the plate 75 so that all four edges of a piece of sheet material can be squeezed into the respective clamping gaps by squeezing roller disks 115,116 moving substantially horizontally and further squeezing disks 117. Only one squeezing roller disk 117 is visible in FIG. 8. The other is directly in front of the plane of the drawing. The rollers 115 and 116 are movable into positions outside of the clamping devices 84 of the tentering frame, so that the tentering frame may be moved out of the apparatus of FIG. 8 substantially in the direction of the arrow 118.

FIG. 8 further shows a hold-down and cutting unit 119 including a so-called ORIGA (trade name) cylinder 120 sold by ORIGA GMBH PNEUMATIC in Filderstadt, Federal Republic of Germany and a linear pneumatic drive 121. The piston of the cylinder 120 drives the folding or squeezing roller disk 115 and a cutting knife 122, as will be described in more detail with reference to FIGS. 9 and 10. A further ORIGA cylinder 123 drives the squeezing or folding disk 116. A further ORIGA cylinder 124 drives the squeezing or folding disk 117.

Figure 9:
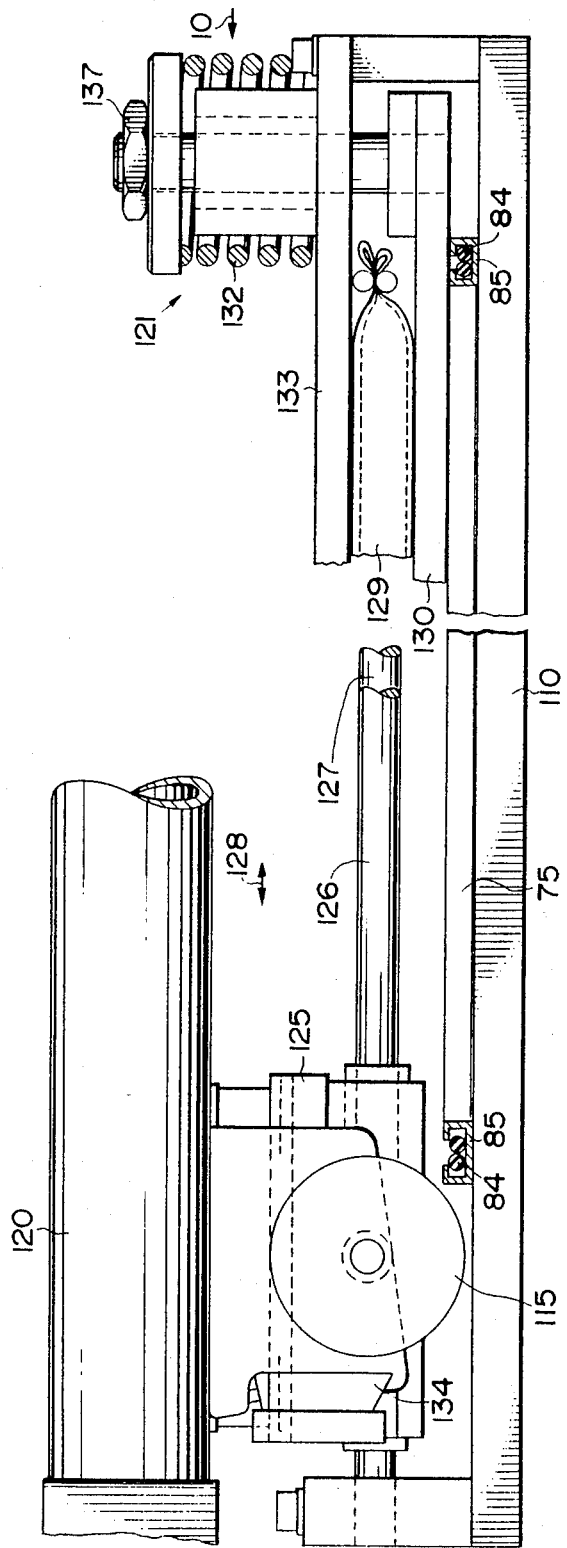
FIG. 9 is a view in the direction of the arrow 9 in FIG. 8 whereby the left portion of FIG. 9 shows a mounting and drive for a cutting knife and a folding disk while the right hand portion of FIG. 9 shows a sheet hold down mechanism behind the mounting and drive, which is broken away in the right hand portion.
Figure 10:
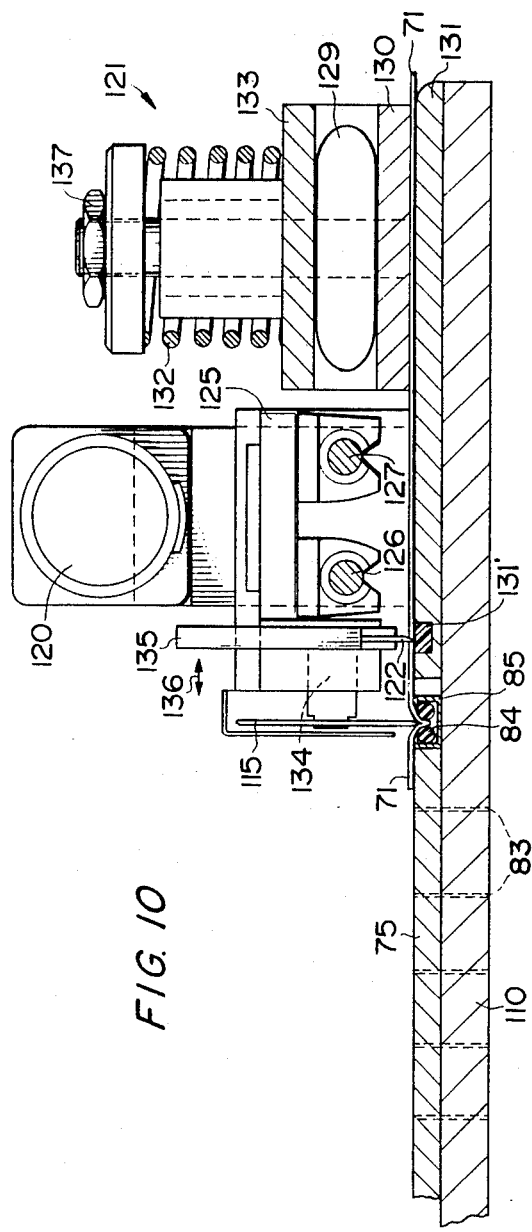
FIG. 10 is a view, partially in section, in the direction of the arrow 10 in FIG. 9 showing further details of the mounting and drive for the cutting knife and folding disk of FIG. 9.

FIG. 9 shows on an enlarged scale, relative to FIG. 8, the view indicated by the arrow 9 in FIG. 8, whereby the left-hand portion of FIG. 9 shows the ORIGA cylinder 120, while the right hand portion shows the linear pneumatic drive 121 behind the ORIGA cylinder 120. A mounting 125 secures the folding or squeezing disk 115 to the ORIGA cylinder 120. The mounting 125 is guided by two guide rods 126 and 127 for movement back and forth as indicated by the double arrow 128. The entire mounting 125 moves along the ORIGA cylinder 120. In FIG. 9 the mounting unit has reached almost its left hand end position. When the mounting unit with the roller 115 reaches the end position entirely, it does not obstruct the removal of the tentering frame 85 which surrounds the plate 75 entirely. The tentering frame portion through which the roller disk 115 moves is not seen in FIG. 9, but it is seen in FIG. 10. The linear pneumatic drive 121 with its expansion hose 129 presses a hold-down bar 130 against a spacer member 131 supported by the wall member 110 to thereby hold a sheet 71 of flat material in place, when the cutting knife 122, moved by the ORIGA cylinder 120 severs a portion from the sheet material rolled off the roller 72. A reset spring 132 returns the hold-down bar 130 into the normal position, in which it does not hold the sheet 71 against the spacer plate 131. As shown in FIGS. 9 and 10 the hose 129 is expanded thereby bearing against a fixed frame member 133. The mounting 125 is provided with a dove tail groove 134 for securing the knife 122. A knife holder 135, not shown in FIG. 9, is secured to the dove tail groove 134 whereby the knife 122 is adjustable in the direction of the arrow 136, as shown in FIG. 10. A nut 137 permits the adjustment of the reset force of the spring 132. The mounting and operation of the roller disks 116 by the ORIGA cylinder 123 and of the roller disks 117 by the ORIGA cylinder 124 is the same as shown in the left hand part of FIG. 9 and therefore not described in further detail. The same applies to the counter part roller disk of the roller disk 117. However, the ORIGA cylinders 123 and 124 and the ORIGA cylinder for the roller not shown do not carry any knives. From FIGS. 7 and 8 it is clear, that the incline of the plate 75 facilitates the sliding of the sheet material 71 onto the flat surface of the plate 75 aided by gravity.

Incidentally, in FIG. 10, the spacer member 131 has inserted therein a replaceable strip of hard plastics or rubber material forming a counter surface for the knife 122, thereby protecting the surface of the spacer member 131.

Figure 17:
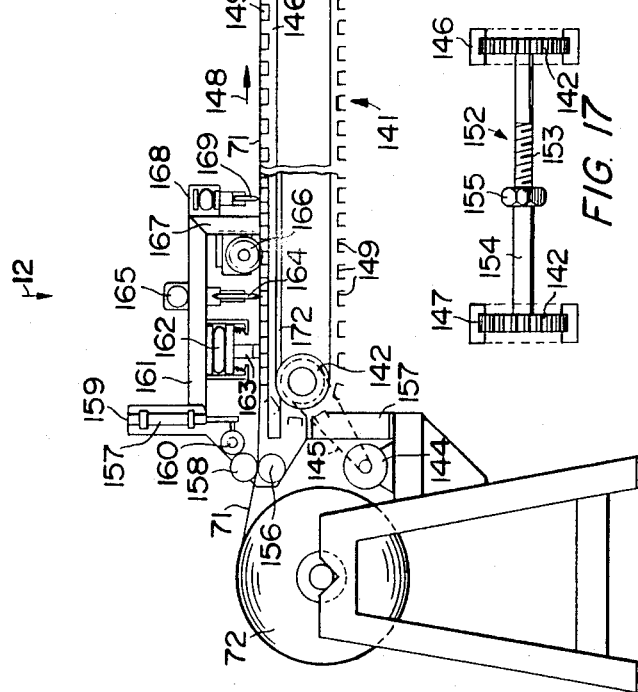
FIG. 17 is a side view of an adjustable length axle for the conveyer drive and guide sprockets.

FIG. 11 illustrates an apparatus for transporting pieces of flat sheet material into a processing station 140 with the aid of an endless chain conveyer 141 running around, for example, sprocket wheels 142 and 143 driven by a motor 144 through a chain drive 145. The endless chain conveyer comprises two endless chain runs 146 and 147, as shown in FIG. 17. Each chain run has an upper chain run portion and a lower chain run portion. The conveyer travels in the direction of the arrow 148, as shown in FIG. 11.

Figure 18:
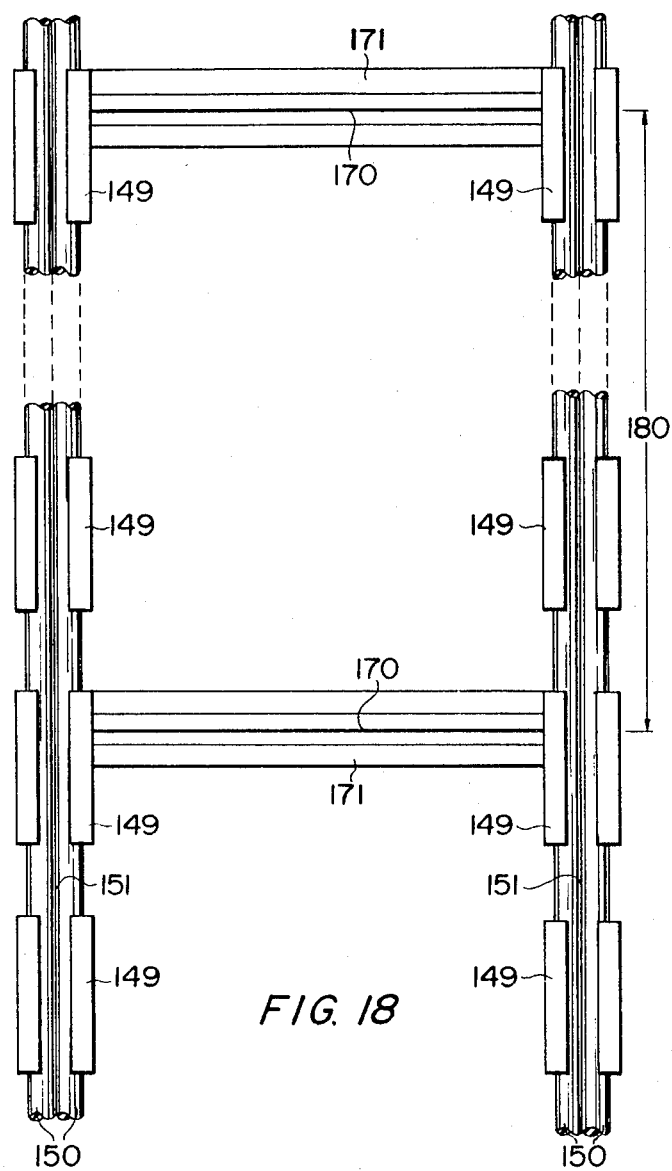
FIG. 18 is a simplified top plan view onto the clamping elements of a portion of a modified tentering chain conveyer.

Each chain run carries a plurality of elongated clamping sections 149 pivotally secured to the respective chain run for forming tentering chains. Each clamping section comprises at least one elongated elastically yielding element such as a rubber cord 150 or preferably two rubber cords 150 which may be of the endless type and extend around the entire chain run. Where two rubber cords 150 are used, as shown in FIG. 18, the respective cords form counter elements for each other and they are held in place alongside each other by the respective housing member. The housing members hold the cords rigidly in place relative to each other for forming clamping gaps 151, which also run around the respective chain run. Each clamping gun 151 faces upwardly in the upper chain run portion and thus in a direction substantially perpendicularly to a plane defined by a piece of sheet material 71. Thus, the edges of the flat material can be squeezed into the clamping gaps 151 in the vertically down direction. Even without adjusting the spacing between the two chains runs, it is possible to use the present tentering chain for sheet material having different widths, whereby the selvage to but cut off would be wider or smaller. However, the spacing between the two chain runs may also be adjustable by mounting the sprocket wheels 142 on axles which are adjustable in their lengths, as for example shown in FIG. 17. The axle 152 has two sections, one is provided with an external threading 153 and the other section 154 is provided with an internal threading. A nut 155 serves for locking the two axles sections relative to each other after an adjustment has been made. Such adjustable axles are conventional.

FIG. 11 further shows in its left hand portion a driven roller 156 mounted in a machine frame member 157. A counter roller 158 is also mounted in the machine frame 157 for transporting the sheet material 71 from the roller 72 onto the tentering chain conveyer 141. A piston cylinder device 159 also mounted in the machine frame 157 presses a hold-down roller 160 against the counter roller 158 to assure a uniform pulling of the sheet material 71 off the roller 72.

A frame member 161 forming part of the machine frame 157 supports a linear pneumatic drive 162, which operates a hold-down bar 163 during the operation of the cutting knife 164 operated by an ORIGA cylinder 165 of the same type as described above. The ORIGA cylinder 165 is also supported by the frame member 161. Two folding roller disks 166, shown in more detail in FIG. 13, serve for squeezing the margins of the sheet material 71 into the clamping gaps 151 of the clamping sections 149. The folding disks 166 are mounted to the downwardly extending arm 167 of the frame member 161 and are driven counter-clockwise by conventional drive means not shown. Simultaneously, these disks 166 are pressed downwardly sufficiently for the squeezing action and their rotation in the counter-clockwise direction facilitates the movement of the sheet material together with the tentering conveyer. As soon as the two margins of the sheet material adjacent to the leading edge of the sheet material have been squeezed into the squeezing gap, the squeezing force is sufficient to enable the conveyer to pull the sheet material along.

If desired, a further linear pneumatic drive 168 may be mounted to the downwardly extending arm 167 of the frame member 161. The drive 168 carries a folding edge 169 for squeezing the sheet material into clamping gaps 170 for clamping sections 171 extending between the clamping section 149, as shown in FIG. 18. It is to be understood, that, when using the clamping sections 171, the spacing between the clamping gaps 151 will be fixed. However, even in such an embodiment, it is possible to handle sheet material of different widths, because it is possible to cut off larger or smaller margins.

A flat surface table 172, also shown in FIGS. 12 and 14, provides a counter support for the operation of the hold-down bar 163 and for the operation of the cutting knife 164 as well as of the folding or squeezing roller disk 166 and the folding edge 169.

Referring now to FIGS. 12, 13 and 14, FIG. 12 shows, on an enlarged scale, a view in the direction of the arrow 12 in FIG. 11, however omitting the drive 162 so as to only show the hold-down bar 163. The frame member 161 is also not shown for simplicity's sake in FIGS. 12, 13 and 14. As viewed in the travel direction 148 the hold-down bar 163 becomes first effective after the conveyer has stopped. Then the ORIGA cylinder 165 moves the knife 164, for example in the form of a roller knife, across the width of the sheet material. Thereafter, the folding or squeezing disks 166 become effective. The disks 166 could, for example, be driven by a separate motor and chain and sprocket drive not shown. Both disks are mounted on a common shaft 174 rotatably supported in a stationary tubular member 175, which could, for example, be interrupted along its length to provide a circular gap for a sprocket wheel rigidly secured to the shaft 174 for driving the folding disks 166.

As best seen in FIG. 14, the grooves 173 in the table 172 have a horizontal width to conveniently accommodate the tentering chain runs 146, 147. This horizontal width may be substantial to permit adjustment of the spacing between the chain runs. The grooves 173 have a depth, so that the clamping sections 149 of the upper run portions 146, 147 of the tentering chain conveyers 141 protrude above the top surface of the table 172. Thus a portion 71' of the sheet material 71 bulges above the surface of the table 172 to provide sufficient material for squeezing into the clamping gaps 151. When the clamping is completed, the sheet material 71 is uniformly stretched across the width between the chain runs as shown in FIG. 13.

FIG. 15 shows an upper chain run portion 146 of the tentering chain 141. Each clamping section 149 is pivotally mounted on an axle 176 by mounting elements 177. A roller 178 is also mounted on the shaft 176. These rollers 178 are engaged by the sprockets of the sprocket drive wheel 142 for propelling the tentering chain conveyer 141. Further, the rollers 178 ride on the floor of the grooves 173 in the table 172. The horizontal width of the grooves may be larger than shown for accommodating the adjustment of the spacing between the sprocket wheels 142, as described above with reference to FIG. 17. The shafts 176 are interconnected by chain link elements 179, as in any conventional drive chain. The length of each clamping section 149 is such, that the tentering chain conveyer will be able to run around the sprocket wheels 142, 143. Further, the elastically yielding rubber cords 150 are sufficiently flexible for running around these sprocket wheels.

Referring to FIG. 18, chains with cross-wise extending clamping sections 171 will normally not be necessary. However, if such cross-wise clamping sections 171 are used for securing a piece of sheet material along its four margins, then the spacing 180 between two adjacent clamping gaps 170 will correspond approximately to the length of a piece of sheet material to be transported into the processing station 140 by the tentering chain conveyer 141.

Incidentally, the clamping sections 149, 171, are constructed as described above. The housing may, for example, be a length of sectional stock, having an open side through which the rubber cords 150 are squeezed into the housing.

According to the invention, the clamping gas, such as 151 170, always face perpendicularly toward the plane defined by a piece of sheet material 71, whereby the advantage is achieved, that disks, such as 166, or squeezing edges, such as 169, may be used for squeezing the sheet material into the clamping gap. This is not possible, when the clamping gap faces an edge of the sheet material, as is the case in the prior art.

Referring again to FIG. 11, the processing station 140, such as a laminating station, is not part of the invention. Therefore, the processing station 140 is described only to the extent necessary for explaining the transfer of a piece of sheet material from the tentering chain conveyer 141 onto a substructure 181, such as the internal frame of a car door resting on a lower mold platform 182 in a precisely defined position. As shown in FIG. 11, the upper mold components 183, 184, 185 and 186 are shown in the mold closing position. However, prior to moving a piece of material 71 into the laminating station 140, the upper mold components 183 to 186 are sufficiently lifted above the level 187 so as not to interfere with the movement of the sheet material 71 into the laminating station. The entire internal machine frame 188 may be lifted by a piston rod 189. Then the conveyer 141 is stopped. Next, the upper mold components 185 and the piston rods 67 are lowered for partly closing the mold whereby the springs 55 are pressed down and the clamping bars 65 and the downwardly facing surface of the upper mold component 185 contact the sheet material thereby pulling it out the clamping sections and against the clamping rails 57'. This operation does not wrinkle the sheet material because the elements 57' and 65 extend all around the mold structure, so that all edges of the sheet material are properly held again. Next the remaining upper mold components are closed and the lower platform 182 is lifted by expandable hose sections 190 to fully close the mold for applying the laminating pressure. Once the sheet material 71 is removed from the conveyer the latter can travel back for attaching a new sheet of material as described above. However, where the conveyer is equipped with crosswise extending clamping sections 171, travel of the conveyer would be stopped, until the upper mold components and the piston rods 67 are lifted again. Prior to such lifting, the trimming knives 191 are operated by respective drive members 192. The trimming knives extend all around the mold. The trimmed off waste material may be removed manually, for example.

Figure 19:
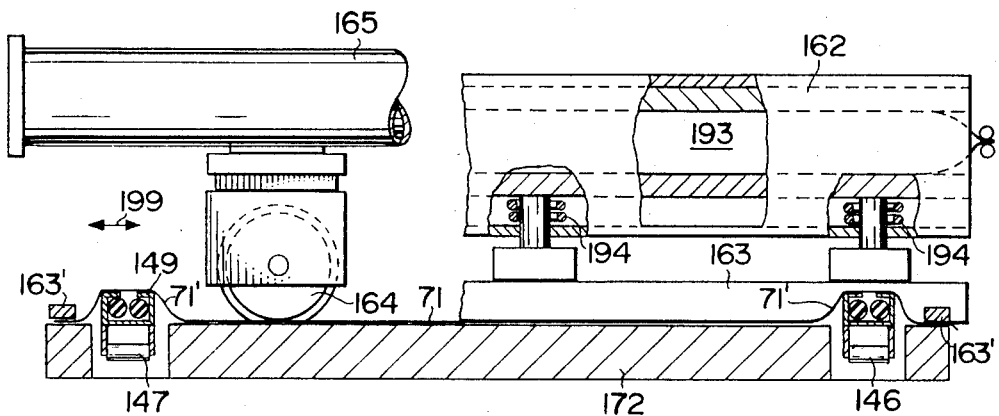
FIG. 19 is a view in the direction opposite to the conveyer travel direction partially in section in a plane just downstream of an ORIGA drive cylinder for the cutting knife.

FIG. 19 shows in the left hand part the ORIGA cylinder 165 for driving the cutting knife or disk 164. The right hand part of FIG. 19 shows the hose expansion drive 162 for the hold-down bar 163 which is equipped with rigid extension bars 163' extending in the travel direction of the sheet material 71 on the table 172. Prior to the operation of the folding or squeezing disks 166 in FIG. 13 or 166' in FIG. 20, the sheet material 71 again forms a bulge 71' because the respective run 146, 147 of the chain conveyer 141 extends sufficiently above the top surface of the table 172. The hold-down bar 163 then holds down the margins of the sheet material outside the chain run with the aid of its extension bars 163'. Thus, when the squeezing disks 166 or 166' are squeezed into the clamping gap 151 the excess material present in the bulges 71' is squeezed into the clamping gap, whereupon the sheet material 71 is held stretched, as shown in FIG. 20.

After the squeezing operation is completed, the pressure in the hose 193 of the drive 162 is released and the reset springs 194 lift the hold-down bar 163 with its extensions 163' slightly off the surface of the table 172 for permitting the movement of the next sheet length onto the table top.

Figure 20:
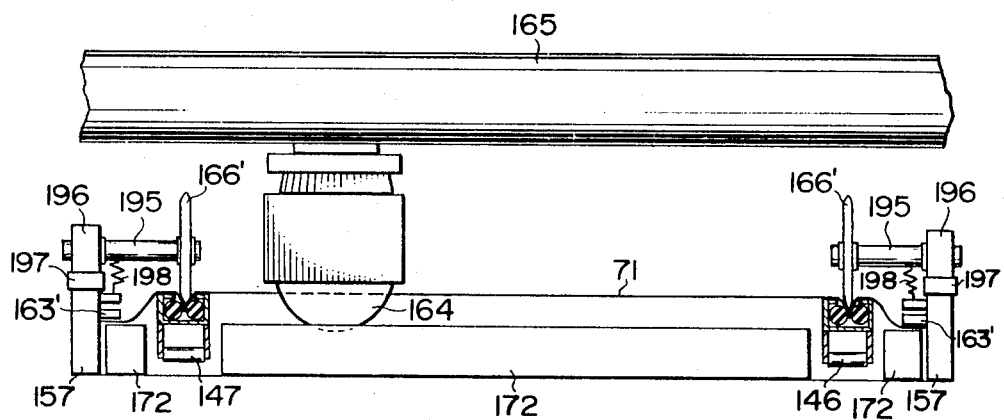
FIG. 20 is a view in a direction opposite to the conveyer travel direction showing a modified folding mechanism for the longitudinal sheet margins.

In FIG. 20 the squeezing disks 166' are rotatably mounted to the ends of non-rotating axles 195, which in turn are rigidly connected either directly to the frame 157 or, as shown in FIG. 20, to arms 196 pivotally connected by journals 197 to the machine frame 157 and biased by springs 198 into the squeezing position, as shown in FIG. 20.

The ORIGA cylinder 165 drives the cutting knife 164 in the direction of the double arrow 199 back and forth across the width of the sheet material 71. Preferably, the cutting takes place, when the sheet material 71 is taut, as shown in FIG. 20.

It has been found, that squeezing the margin portions of the sheet material adjacent to the leading edge of the sheet material into the clamping gaps 151 is sufficient to then continue the squeezing as a result of the forward travel of the tentering conveyer. During the travel of the conveyer the hold-down bars 163' are lifted off the sheet material margins.

Although the invention has been described with reference to specific example embodiments, it will be appreciated, that it is intended, to cover all modifications and equivalents within the scope of the appended claims.

What I claim is:

1. An apparatus for transporting pieces of flat sheet material into a processing station, comprising a machine frame, a pair of tentering frames for holding pieces of sheet material, means operatively mounted in said machine frame for carrying said tentering frames in any one of three vertically aligned positions in said machine frame, first vertical lifting and lowering means operatively arranged in said machine frame for moving said carrying means for said tentering frames vertically up and down to any one of said three vertically aligned positions, second horizontal operating means operatively arranged for moving said tentering frames, one at a time, substantially horizontally back and forth between said processing station and one of said three vertically aligned positions for transporting a tentering frame holding a piece of sheet material into said processing station and for returning an empty tentering frame for receiving another piece of sheet material, said first vertical lifting and lowering means for moving comprising position variable means operatively arranged for permitting the vertical movement of one of said tentering frames in one position of said position variable means and for supporting said tentering frame in another position of said position variable means, whereby an empty tentering frame is presented in an uppermost position of said three vertically aligned positions for filling, and a filled tentering frame is presented in a horizontal transport position of said three vertically aligned positions so that horizontal transporting always takes place at the same level.

2. The apparatus of claim 1, wherein said three vertically aligned positions comprise a lower position, an upper position and an intermediate position between said lower and upper positions, wherein said pair of tentering frames comprise a first tentering frame for holding sheet material and a second tentering frame for holding sheet material, wherein said first means for moving comprise a first support structure for one of said tentering frames and a first set of cylinder piston drive means operatively secured between said machine frame and said first support structure for moving said first support structure and said one of said tentering frames from said lower position to said intermediate position or vice versa, wherein said first means for moving further comprise a second support structure for the other of said tentering frames and a second set of cylinder piston drive means operatively secured between said first support structure and said second support structure for moving said second support structure and the other of said tentering frames from said intermediate position to said upper position and vice versa, said apparatus further comprising first guide roller means operatively arranged between said first support structure and the respective tentering frame, and wherein said position variable means form part of said second support structure and comprise tiltable arms, second guide roller means carried by said tiltable arms and operating means connected for tilting said tiltable arms carrying said second guide roller means back and forth between a tilted-out position and a tilted-in position so that in said tilted-out position the respective tentering frame is movable past said second guide roller means and so that in said tilted-in position said respective tentering frame may rest on said second guide roller means.

3. The apparatus of claim 2, wherein said first vertical lifting and lowering means comprise a first support structure including first drive means for moving one tentering frame from said lower position of said three vertically aligned positions to said intermediate position of said three vertically aligned positions and vice versa, and a second support structure including second drive means for moving another of said tentering frame means from said intermediate position to said upper position of said three vertically aligned positions and vice versa.

4. The apparatus of claim 1, wherein said tentering frames comprise longitudinal clamps arranged to hold said sheet material to the respective tentering frame, said longitudinal clamps comprising a relatively rigid elongated casing closed on three sides and having an open slot along one side, and elastically yielding elements held alongside each other in said casing for forming a clamping gap between said elastically yielding elements, said clamping gap being accessible through said slot for clamping said sheet material between said elastically yielding elements.

5. The apparatus of claim 1, wherein said second means for moving comprise impact piston cylinder drive means operatively arranged for moving said tentering frame, one at a time, substantially horizontally back and forth between one of said three vertically aligned positions and said processing station.

6. The apparatus of claim 1, wherein said first means for moving comprise a first support structure including first piston cylinder drive means for moving said first support structure vertically up and down relative to said machine frame and guide means operatively interposed between said machine frame and said first support structure, said first means for moving further comprising a second support structure and second piston cylinder drive means connected between said first support structure and said second support structure for vertically moving said second support structure relative to said first support structure.

7. The apparatus of claim 6, wherein said first support structure comprises a first set of guide rollers, wherein said second support structure comprises a second set of guide rollers attached to said position variable means as part of said second support structure, and third drive means operatively connected to said position variable means for moving said position variable means between a first position for supporting one of said tentering frames and a second position permitting a free vertical movement of said tentering frames, and wherein said tentering frames comprise guide rails for riding on said first and second sets of guide rollers.

8. The apparatus of claim 7, further comprising mounting means for said first set of guide rollers, said mounting means including spring bias means for supporting said first set of guide rollers in an elastically yielding manner.

9. A method for transporting initially limp, flat sheet material in a stretched out condition on tentering frames from a transport station into a processing station and for returning empty tentering frames from the processing station into the transport station, comprising the following steps:
(a) providing three vertically aligned tentering frame positions in said transport station, one position being a tentering frame waiting position (A), a second position being a tentering frame exchange and transport position (B), and a third position being a filling position (C) in which an empty tentering frame either receives a piece of sheet material or is replaced by a filled tentering frame holding a piece of sheet material,
(b) vertically shifting up or down any one of two tentering frames into any one of said three vertically aligned positions, and
(c) horizontally transporting any one of said two tentering frames out of or into said exchange and transport position (B) while the other tentering frame is either in positions (A or C), whereby horizontal transporting always takes place at the same level.

* * * * *